TELEGRAPH SYSTEM

Filed Sept. 26, 1952 6 Sheets-Sheet 1

*INVENTORS*
G. S. VERNAM
B. V. MAGEE
*BY* [signature]
ATTORNEY

INVENTORS
G. S. VERNAM
B. V. MAGEE
BY
M. R. Marsh
ATTORNEY

March 13, 1956 G. S. VERNAM ET AL 2,738,376

TELEGRAPH SYSTEM

Filed Sept. 26, 1952 6 Sheets-Sheet 3

*INVENTORS*
G. S. VERNAM
B. V. MAGEE

*BY* M. R. Marsh

ATTORNEY

March 13, 1956 G. S. VERNAM ET AL 2,738,376

TELEGRAPH SYSTEM

Filed Sept. 26, 1952 6 Sheets-Sheet 4

INVENTORS
G. S. VERNAM
B. V. MAGEE

BY M. R. Marsh

ATTORNEY

TELEGRAPH SYSTEM

Filed Sept. 26, 1952

6 Sheets-Sheet 5

INVENTORS
G. S. VERNAM
B. V. MAGEE
BY
M.R. Marsh
ATTORNEY

INVENTORS
G. S. VERNAM
B. V. MAGEE
BY M. R. Marsh
ATTORNEY

United States Patent Office 2,738,376

Patented Mar. 13, 1956

2,738,376

TELEGRAPH SYSTEM

Gilbert S. Vernam, Hackensack, and Bruce V. Magee, Red Bank, N. J., assignors to The Western Union Telegraph Company, New York, N. Y., a corporation of New York Application September 26, 1952, Serial No. 311,584

5 Claims. (Cl. 178—4.1)

This invention relates primarily to telegraph systems and apparatus, and more particularly to telegraph selectors.

Many small telegraph stations do not receive and send a sufficient number of messages to economically justify a separate circuit or connection to a switching center or central office, and it is the usual practice in such cases to connect a number of such small stations to the central office by a single party line circuit or so-called way-wire. In these cases it is highly desirable that the central office be able to selectively call and transmit to each of the individual way-stations on the wire, one at a time, and for each of the way-stations to be able to seize the way-wire for its exclusive use to transmit to the central office or to the other way-stations.

In view of the above, it is one of the primary objects of the present invention to provide a new and improved telegraph way-wire station selector which is operable in conjunction with the modern automatic high speed telegraph printing and transmitting mechanisms employing permutation code signals, such as the well known five-unit start-stop Baudot type.

Another object of the present invention is to provide a way-wire station selector which operates on the usual start-stop printer code signals without requiring special signals such as long or timed open line pulses.

Another object of the invention is to provide a way-wire station selector which operates independently of the way-station printer, thus avoiding the need of special selecting contacts on the printer, and which eliminates the recording of false characters by the printer.

Another object of the invention is to provide a way-wire station selector that is fast in operation and where the selection of one station automatically busies or locks out the other stations from use of the way-wire.

Still another object of the invention is to provide a new and improved arrangement for calling the central office from a way station and simultaneously locking out the other way stations.

Still another object of the present invention is to provide an automatic arrangement for releasing the way-wire when the last transmitting station fails to transmit an end-of-message signal within a predetermined length of time. In this connection, a more specific object of the invention resides in the provision of an arrangement for automatically generating an end-of-message signal code combination when the line has been idle for at least a predetermined length of time and the last transmission was not an end-of-message signal.

Still another object of the invention resides in the arrangement whereby a transmitting station may retain control of the way-wire to transmit a plurality of successive messages thereover and terminating each message with the normal end-of-message signal which normally releases the way-wire.

The above and further objects of the invention will be more apparent in the following detailed description of an illustrative embodiment thereof, wherein reference is made to the accompanying drawings, in the latter of which:

Figure 1:
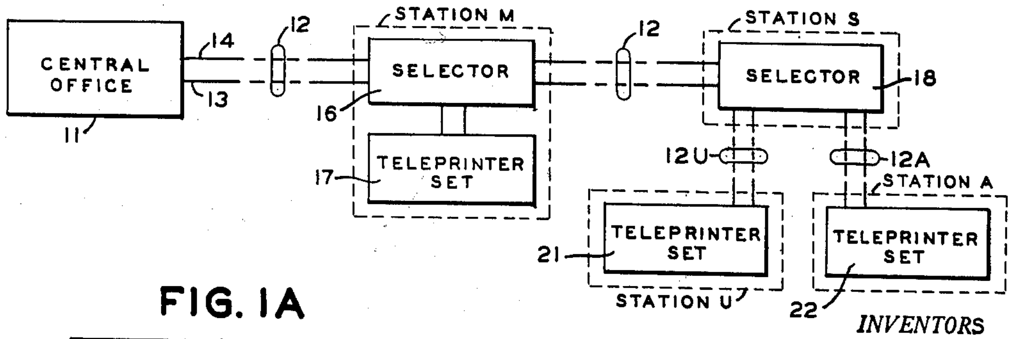
Fig. 1 is a diagrammatic showing of how the geographically separated way-stations and their associated selectors may be arranged and associated with a way-wire circuit.
Figure 1A:
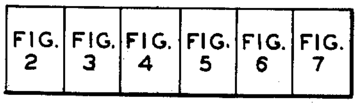
Fig. 1A shows the manner in which Figs. 2 to 7, inclusive, may be arranged adjacent one another to show the details of an illustrative embodiment of the invention.

Referring now to Fig. 1, there is shown the general arrangement of a way-wire 12 as it may be employed to connect three teleprinter stations M, U and A to a central office 11. The way-wire 12 includes a sending leg or channel 13 and a receiving leg or channel 14 with respect to the central office and these channels or legs may comprise two one-way telegraph channels or a full duplex telegraph channel or the equivalent capable of transmitting telegraph signal impulses of the low frequency start-stop type. As shown in Fig. 1, the selector 16 for station M is located thereat and serves to control the associated teleprinter set 17 and the way-wire 12 extends therethrough to station S. A selector 18 is located at station S and sending and receiving legs extend therefrom to teleprinter sets 21 and 22 at stations U and A, respectively, geographically separated from station S and separated from each other. While stations U and A are shown separated from station S, it will be obvious that one or the other of these could be combined with station S and the way-wire 12 could be extended to a number of other stations.

Among other things each teleprinter station set, as will be more fully described hereafter, includes in addition to the usual keyboard and printing mechanism a call button, an operate lamp and a busy lamp. The teleprinter sets operate in response to received start-stop type signals and the keyboards employed therewith are for transmitting this type of signal.

*Transmitting from the central office*

Figure 2:
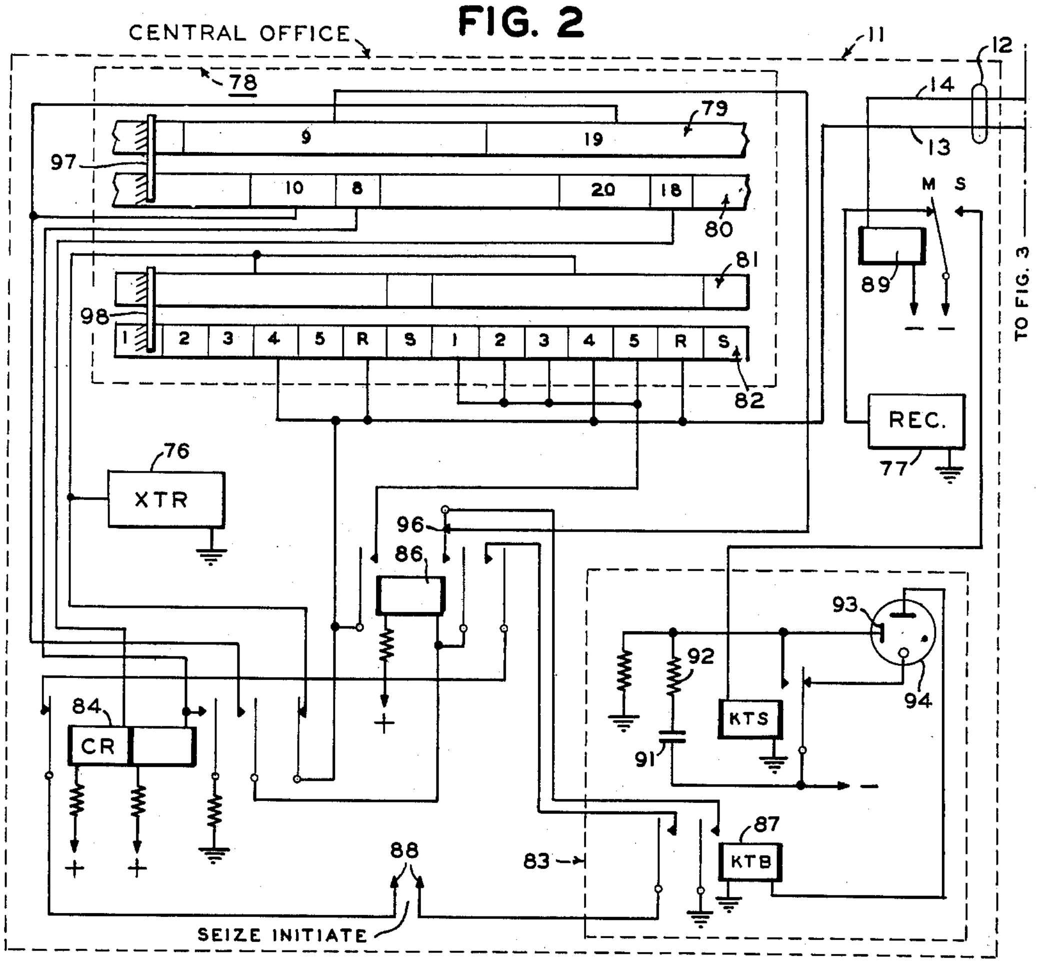
Figs. 2 to 7 show circuit details of an illustrative embodiment of the invention.
Figure 3:
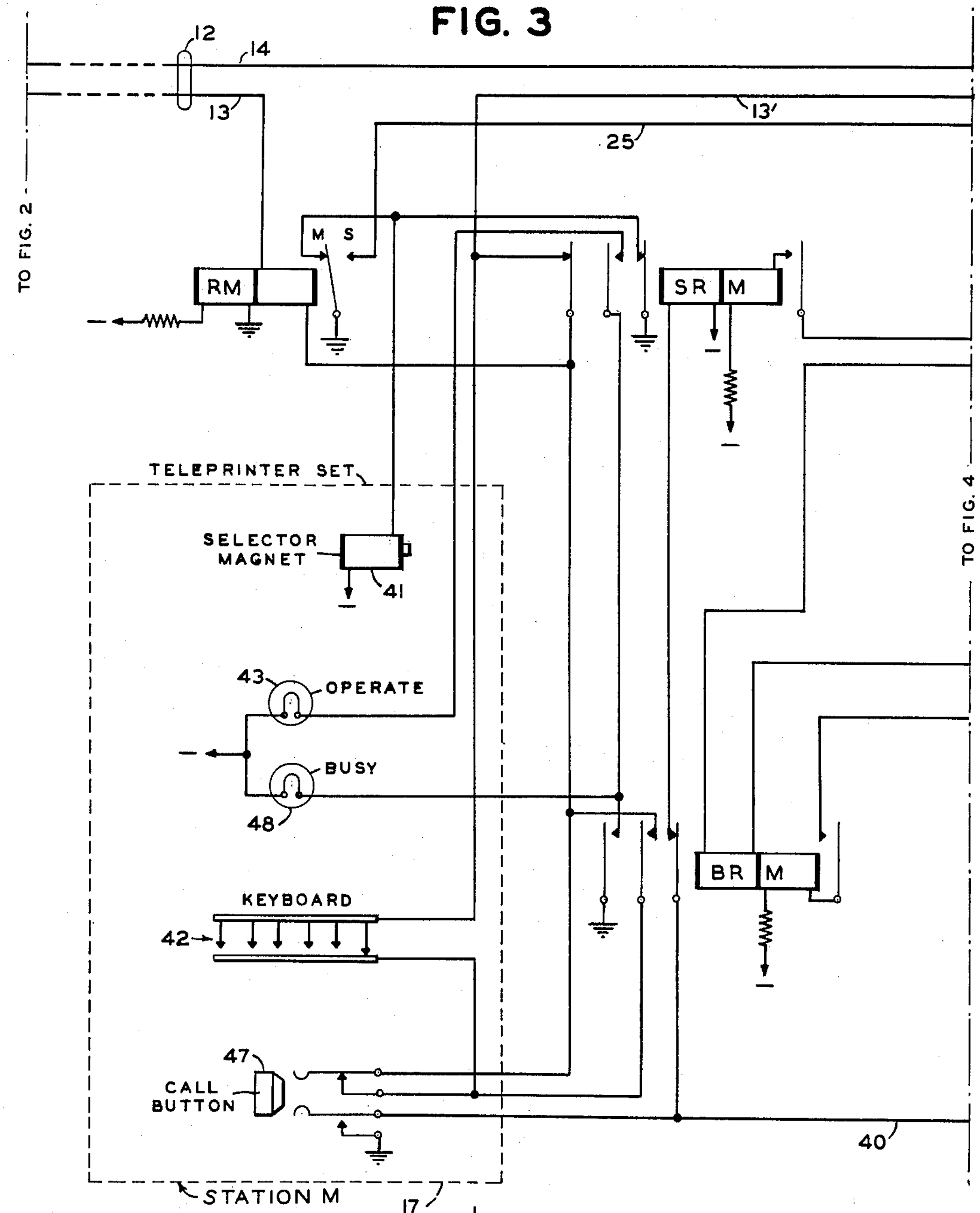
Figure 4:
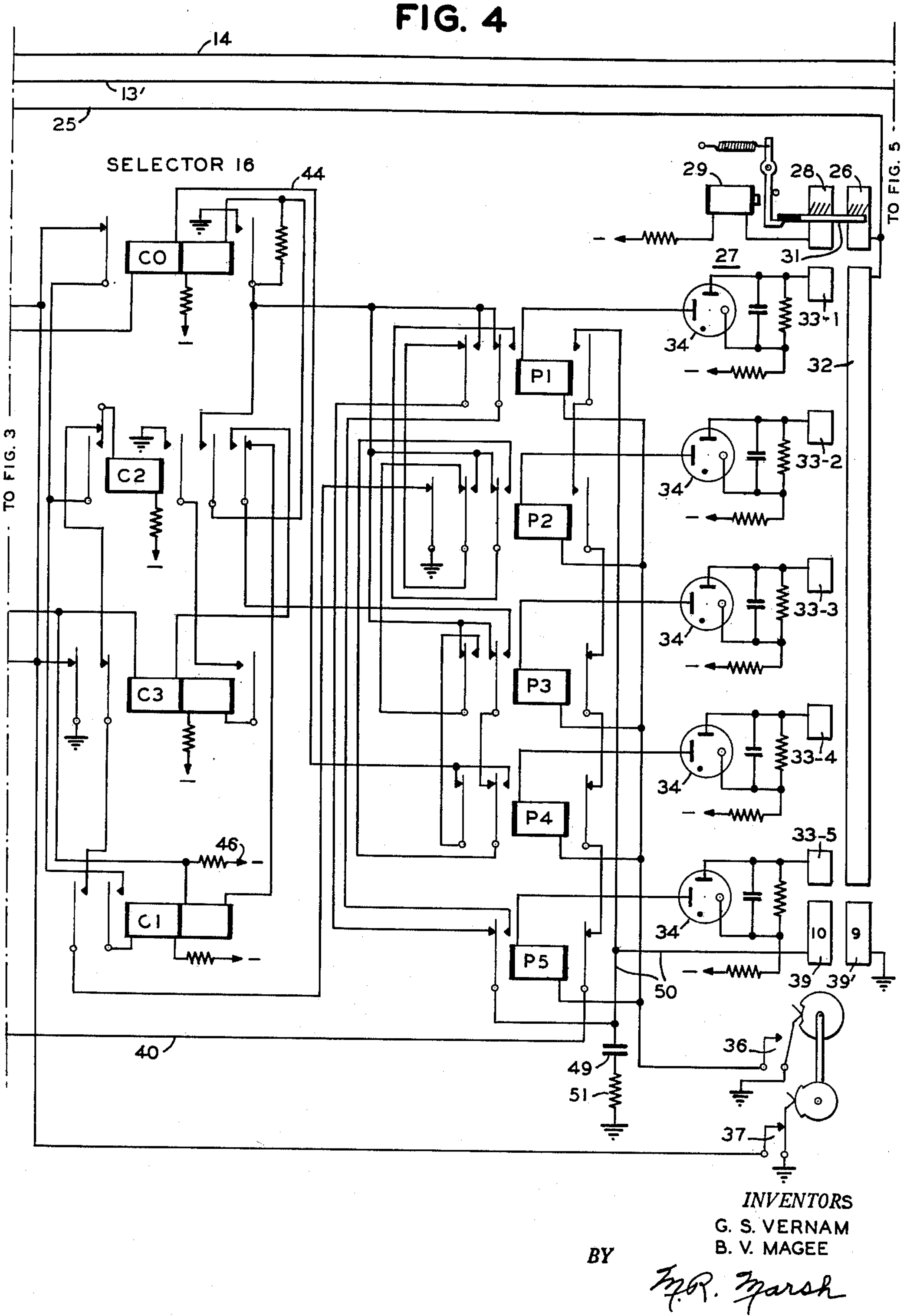

Referring now to the detailed circuit drawings and particularly Figs. 2, 3 and 4, it will be assumed that the way-wire circuit 12 is idle and that the central office has a message for station M. If the way-wire is associated with a central office employing automatic switching mechanisms, the message at the central office will usually be stored in a perforated tape adapted to control a distributor transmitter. At such central offices, there is usually a so-called message numbering machine for each station on the way-wire and when the distributor transmitter is associated with the way-wire, the numbering machine for station M is activated and transmits over the way-wire the call letter of the station to which the message is to be sent, which in the case assumed, is the letter M followed by a figures shift character and the message sequence number. The numbering machine disconnects itself from the way-wire after completing its cycle of operation and the distributor transmitter then transmits the message. In central offices where transmission to a way-wire is directly from a key board, the operator manually transmits the station call letter, figures shift character, and message sequence number preceding the message.

The normal idle condition of the way-wire 12 is closed line or marking, with potential being applied to one of the legs thereof and ground to the other, and the code combination transmitted thereover are pulses of current and no-current or closed and open line conditions, respectively. Each code group is preceded by a spacing open line condition and determined by a marking closed line condition as is the usual practice in start-stop telegraphy.

Figure 5:
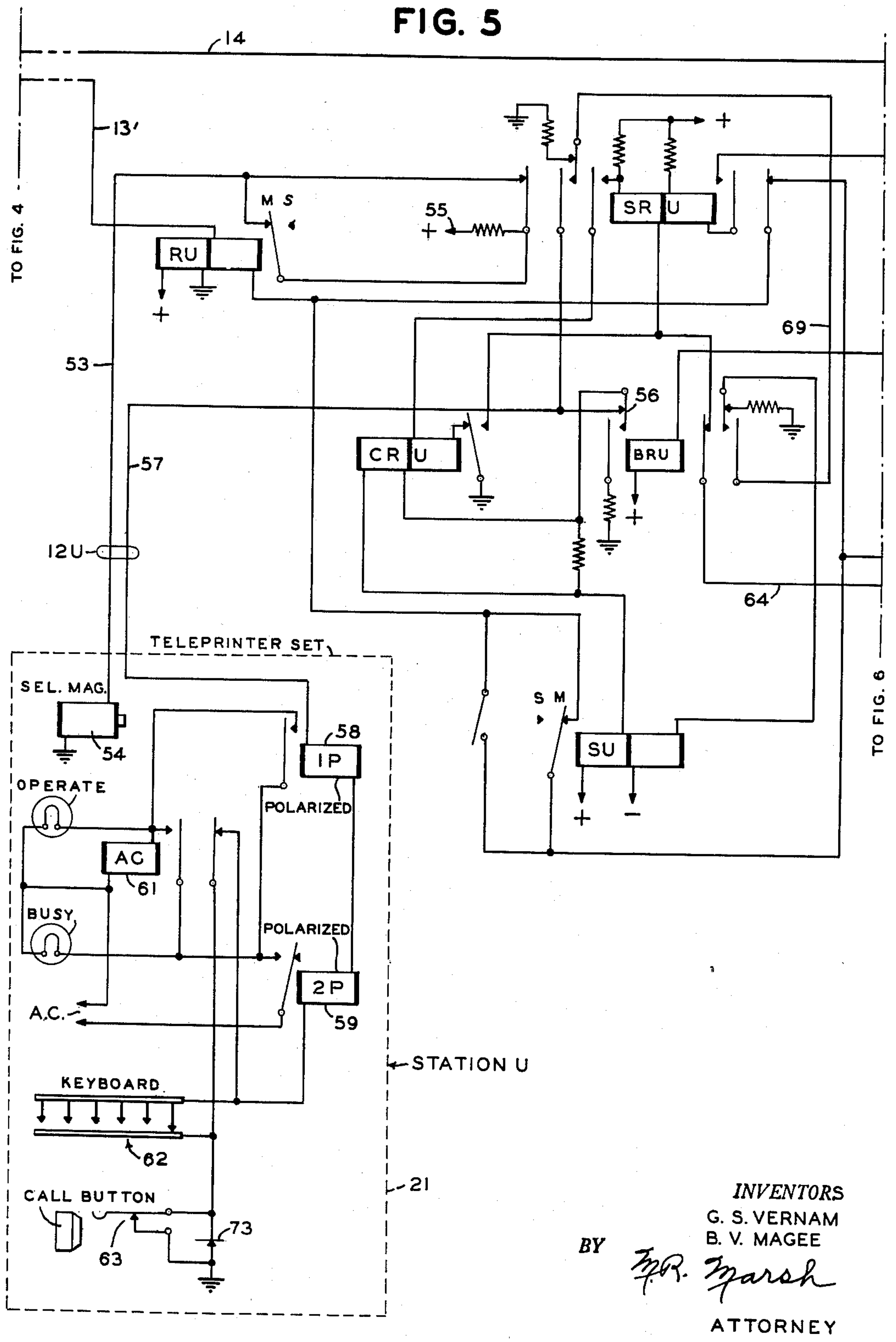
Figure 6:
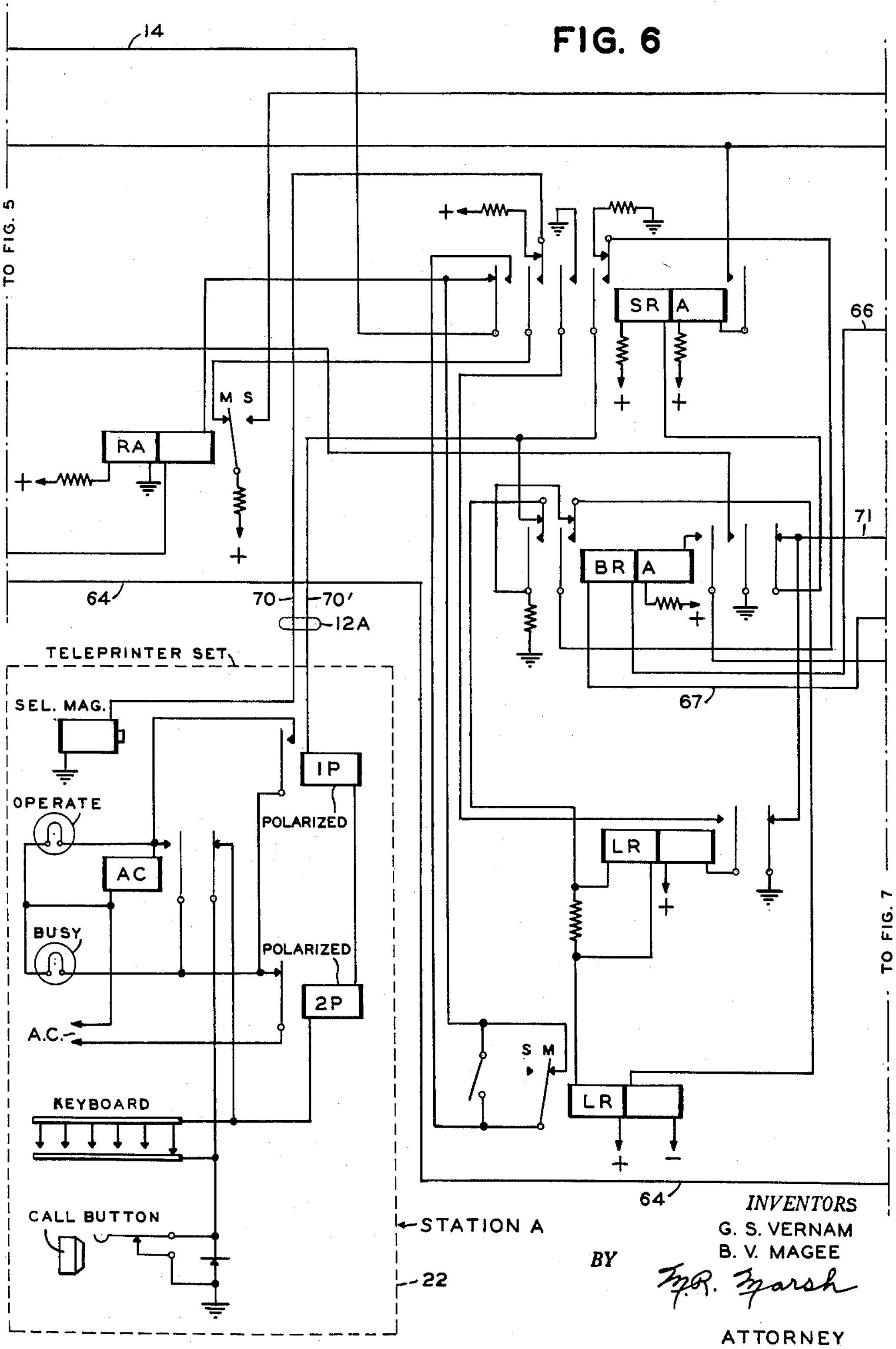
Figure 7:
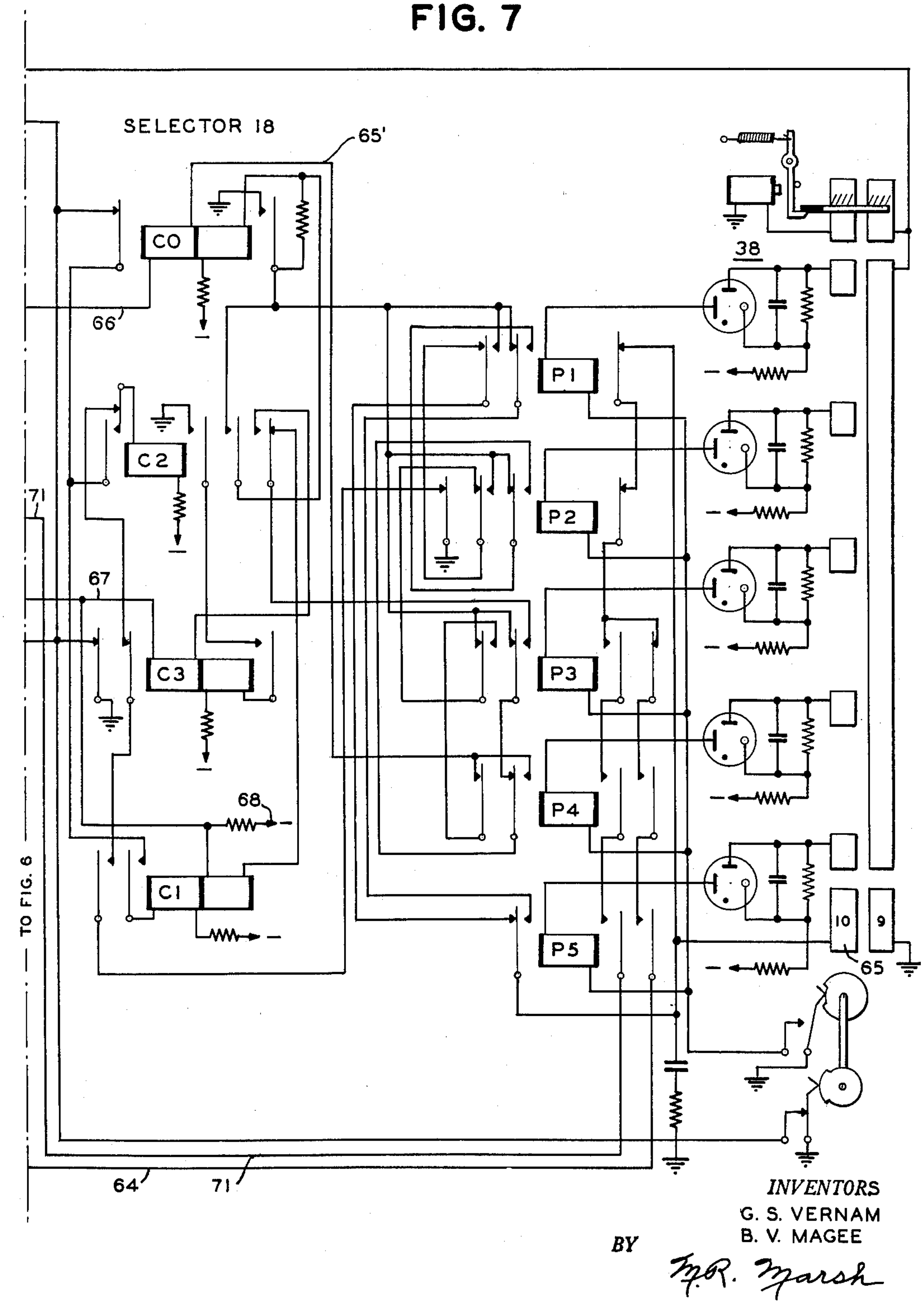

At station M the sending leg 13 extends through the right hand coil of receiving relay RM, the outer left hand tongue and back contact of seize relay SRM and then over section 13' of the sending leg to station S, Figs. 5 and 6. Here, the receiving leg 13' extends through the right hand coil of receiving relay RU, the outer right hand tongue and back contact of the seize relay SRU, then through the right hand coil of the receiving relay RA, the back contact and outer left hand tongue of seize relay SRA, to the receiving leg 14 and back to the central office 11. Each station M, U and A have an associated seize relay and a receiving relay, and the receiving relays RM, RU and RA respond to all signals transmitted over the sending leg 13. At station M, Figs. 3 and 4, the spacing contact S of relay RM is connected by a conductor 25 to the segment 26 of a start-stop receiving distributor 27. The associated segment 28 is connected through a release magnet 29 to potential. In the idle line condition, the receiving distributor is at rest with the brush 31 thereof bridging segments 26 and 28. Accordingly, the start impulse accompanying the code for the call letter M causes the tongue of the receiving relay RM to ground conductor 25 and energize release magnet 29. Thereupon the frictionally driven brush 31 is free to rotate for one revolution and successively connects the spacing contact of the relay RM through the solid ring 32 to the five impulse segments 33—1, 33—2, 33—3, 33—4, and 33—5. The segments 33 are suitably connected to the control anodes of associated electronic tubes 34, such as 0A4G tubes, and the tubes become ionized as ground is applied to the control anodes thereof. In the assumed condition, where the character M is transmitted, which consists of spacing, spacing, marking, marking and marking, the two upper tubes 34 will be ionized and associated pulse relays P1 and P2 of the group of five pulse relays P1 to P5 will be operated through the plate circuits of the specified tubes when the contacts 36 close. The contacts 36 as well as normally closed contacts 37 are operated by cams of the distributor 27. The cam associated with contacts 36 is arranged to close the same before the brush 31 reaches segment 33—1 and permit the contacts to open after the brush has left segment 39. In a similar manner, the receiving distributor 37, Fig. 7, operates under the control of receiving relay RA to energize the first two pulse relays P1 and P2 associated therewith.

The right hand tongues and contacts of the pulse relays P1 to P5 of Fig. 4 are arranged in such a manner that a circuit is completed therethrough when the pulse relays are operated in accordance with the call letter M and the subsequent bridging of segments 39 and 39' by the brush 31 applies ground through these right hand tongues and contacts of the pulse relays over conductor 40, the inner left hand tongue and back contact of relay BRM and the left hand coil of relay SRM to potential. Accordingly, the seize relay SRM at selector 16 is operated. Since the pulse relays P1 to P5 associated with the receiving distributor 38, Fig. 7, have a different arrangement of connections to the right hand tongues thereof, a circuit will not be completed therethrough when the letter M is received by this receiving distributor and, accordingly, the seize relays SRU and SRA for stations U and A, respectively, will not be energized at this time.

As relay SRM operates it locks up by a circuit from potential through its right hand coil, front contact and right hand tongue, and a back contact and outer left hand tongue of relay C3 to ground. Relay SRM in operating removes a holding ground from the marking contact of the receiving relay RM so that the selector magnet 41 of the teleprinter set 17 is conditioned to follow the operation of the receiving relay RM. Through its outer left hand tongue relay SRM removes a short circuit from around the keyboard contacts 42 of the teleprinter set and through its middle left hand tongue prepares a circuit for the subsequent illumination of the operate signal lamp 43. When the distributor brush 31 subsequently reaches its normal rest position, the magnet 29 will be de-energized, since the closed line rest impulse will be effective on the receiving relay RM, to stop the brush and at this time the contacts 36 are open and the operated pulse relays will be released and the ionized tubes 34 deionized.

The start impulses accompanying each code group transmitted invariably release the receiving distributors such as 27 and 38 on the way-wire, and accordingly are released for the figures shift character transmitted following the call letter. The figures shift code is marking, marking, spacing, marking and marking, and as this code is applied to the tubes 34 associated with the various receiving distributors, the P3 relay of the various groups of five pulse relays P1 to P5 is operated when the contacts such as 36 close. With relay P3 of the pulse relays of Fig. 4 operated, a circuit is completed from segment 39 of the distributor 27, over conductor 50, through the back contacts and left hand tongues of relays P1, P2, P4 and P5, and a front contact of relay P3 to conductor 44 and through the left hand coils of relays CO and BRM to potential at 46. Accordingly, when the brush 31 reaches segments 39 and 39', relays CO and BRM are operated. Relay CO only operates momentarily but relay BRM locks up by a circuit through its right hand coil to ground at a back contact and tongue of relay C3. At station S, Figs. 6 and 7, a corresponding CO relay and relay BRA are also operated in response to the figures shift character, and relay BRA in operating locks up and establishes a circuit for operating relay BRU, Fig. 5. At selector 16, the operation of relay BRM opens the original operating circuit for its associated relay SRM. Through its second left hand tongue, relay BRM short-circuits the upper contacts of the call button 47 and through its outer left hand tongue completes a circuit for operating both the operate lamp 43 and the busy lamp 48. At other than the called stations only the busy lamps are operated by circuits that are obvious or hereinafter described. The condenser 49 connected to the conductor 50 prolongs the operating current pulse through relays such as SRM, BRM and CO, to improve their operating characteristics. The resistor 51 permits the condenser 49 to charge through certain contacts of relays P1, P2, P3 and P4 when the condenser is not connected to a relay. The current through resistor 51 is not sufficient to hold relay CO operated.

At the called station, which in the assumed case is station M, the selector 16 thereat will now have relays SRM and BRM operated and the operate lamp 43 and the busy lamp 48 illuminated. This station is now locked in on the circuit and accordingly the selector magnet 41 will respond and cause the recording of all further characters transmitted over the way wire 12. At the other or uncalled stations only the relays such as BRU and BRA are operated, and the teleprinter sets associated with such stations are locked out since their associated seize relays such as SRU and SRA are unoperated and can not operate in response to their respective call letters as the operating circuits thereto are open through their associated relays BRU and BRA. However, the selectors and receiving distributors such as 38 at the other stations continue to respond to line signals.

At each of the selectors certain characters such as figures shift, marking, marking, spacing, marking, marking; space characters, spacing, spacing, marking, spacing, spacing; or blanks, spacing, spacing, spacing, spacing, spacing; in the message cause the momentary operation of the C0 relays but have no effect on the operation of the circuits, and the same is true for other characters in the message except for a carriage return character, spacing, spacing, spacing, marking, spacing. The effect of a carriage return character on the circuits of selector 16, Fig. 4, will now be described. Such a character operates relays P1, P2, P3 and P5 to complete a circuit from segment 39 through left hand contacts and tongues of the pulse relays P1 to P5, a back contact of relay C2 and the right hand coil of relay C1 to operate the same when the brush 31 reaches segments 39 and 39′. Relay C1 is a counting relay and when operated locks up by a circuit through its left hand coil and back contacts of relays C0 and C3. The release of relay P2 at the end of the revolution of the receiving distributor 27 causes the operation of counting relay C2 by a circuit from ground through the outer left hand tongue and back contact of relay P2, a front contact of relay C1, a back contact of relay C3, and through the coil of relay C2 to potential. Relay C2 in operating locks up through its left hand tongue and thus completes the operation of counting one carriage return character.

If the next character is something other than a carriage return, such as a line feed, the pulse relays P1 to P5 establish a circuit for operating relay C0 when the brush reaches segment 39, and this circuit includes a front contact of relay C2 and the right hand winding of relay C0. In the case of figures shafts, blanks, or space characters, relay C0 is operated by a circuit through its left hand coil and including conductor 44. Relay C0 locks up through relay C2 and releases relays C1 and C2, and the latter relay also releases relay C0, restoring the circuit to normal; however, not affecting relays BRM and SRM.

On receipt of a second carriage return character immediately following a first carriage return character, or without intervening characters, the circuit through the contacts of the pulse relays which previously operated relay C1 is transferred to the left hand coil of relay C3 to operate the latter relay. Relay C3 in operating locks up by a circuit through a front contact of relay C2 and also removes the ground from the locking circuits of relays SRM, BRM, C1 and C2. As relay C3 operates at the time the brush 31 reaches segments 39 and 39′, the locking circuit remains grounded through cam control contacts 37. The next received character, which will normally be a letters code, releases the brush 31, and contacts 37 open to cause release of relays SRM, BRM, C1 and C2. C2 in releasing also releases relay C3 and thus restores the counting circuit to normal. The release of relay BRM opens the circuit to the signal lamps 43 and 48, removes the short-circuit around the upper contacts of the call button 47, and reconnects relay SRM to the selected calling circuit. The release of relay SRM at the called station short-circuits the associated keyboard contacts 42 and grounds the marking contact of the associated receiving relay RM.

Thus the selector 16 at station M is restored to its normal idle condition and at the uncalled stations the receipt of the two carriage returns causes release of relays such as BRA and BRU so that the selectors associated therewith will be responsive to their respective call letters to cut in desired telegraph sets.

As indicated in Fig. 1, the teleprinter sets 21 and 22 at stations U and A, respectively, are geographically separated from station S where the selector 18 controls the connection of either station U or A to the way-wire 12. Accordingly, stations U and A are connected to station S by extended legs and each of these stations may be called from the central office in the manner similar to that employed to call station M. However, since the latter two stations are connected to the way-wire by a single selector 15 and through extended leg circuits 12U and 12A, additional control relays and circuits at station S are necessary.

It will now be assumed that the central office has a message for station U and proceeds to transmit the calling character U followed by a figures shift character. In the normal idle condition of the way-wire, positive potential from a source 55, Fig. 5, is applied through a back contact of relay SRU to the receiving leg 53 of the extension 12U to station U and through the coil of the printer selector magnet 54 to ground. This current holds the printer magnet 54 energized and at this time a circuit is established from positive potential through the left hand coils of relays SU and CRU, closed contacts 56 of relay BRU, the sending leg 57 of extension 12U to station U where the circuit continues through the coils of polar relay 58 and 59, a back contact of an AC relay 61, in parallel with the closed rest contact of the keyboard 62, and through the normally closed contacts of the call button 63 to ground. This positive current holds polar relay 59 operated as well as relays SU and CRU. The receipt of the call letter U on the receiving distributor 38 operates the associated pulse relay P1 to P5 to complete a circuit from segment 65 through the right hand tongues and contacts of the said relays, conductor 64, a back contact of relay BRU and the left hand coil of relay SRU to potential. Thus when the brush subsequently reaches segment 65, relay SRU is operated and locks up by a circuit through its right hand coil and a back contact of relay C3 of selector 18. The following figures shift code operates the pulse relays P1–P5 so that when the brush reaches segment 65, a circuit is extended through the contacts of the pulse relays to conductor 65′, the coil of relay C0, conductor 66, the coil of relay BRA and conductor 67 to potential at 68. Relays C0 and BRA thereupon operate, and the latter completes a circuit for the operation of relay BRU.

Accordingly, at this time relays SRU, BRU and BRA at station S are operated, and the figures shift code also caused operation of relay BRM at station M. With relay SRU operated, the selector magnet 54 of the teleprinter set is connected through the marking contact of the receiving relay RU to potential at 53 and hence the magnet responds to the make and break signals repeated from the way-wire via relay RU. Thus, the printer will record all further characters received over the way-wire. At this time the sending legs 57 from station U is connected through a tongue and front contact of relay SRU, conductor 69, a tongue and front contact of relay BRU and through the right hand coil of relay SU to negative potential. This negative potential reverses the direction of current in the sending leg 57 and is effective to operate polar relay 58 and release polar relay 59 to complete a circuit for energizing the AC relay 61. The operation of relay 61 causes both the operate and busy signal lamps to be illuminated and also removes the short-circuit from around the contacts of the keyboard 62. The receiving leg 70 to station A remains connected through contacts of relay SRA to positive potential so that the printer does not respond to line signals repeated through receiving relay RA. The sending leg 70′ from station A is open at the tongue of relay BRA and both the polar relays at station A will be released. This illuminates the busy lamp at station A.

The two carriage return characters following the message to station U operate the counting relays associated with the receiving distributor 38 in much the same manner as set forth above with respect to receiving distributor 27 to open the locking circuits to relays SRU, BRM and BRA to return the circuits to their normal idle condition.

In the same manner a message may be sent from the central office to station A by transmitting the call letter A followed by a figures shift character preceding the message. In this case the call letter A operates the pulse relays P1 to P5 to complete a circuit over conductor 71 and effect operation of relay SRA. The following figures shift character causes operation of relays BRU, BRA and BRM to lock out the uncalled stations, and the message will be recorded only on the teleprinter at station A.

*Transmitting from station M*

It will now be assumed that the way-wire 12 is idle and that the attendant at station M has a message for the central office 11. The idle condition of the way-wire will be apparent to the operator at station M by reason of the fact that the busy lamp 48, as well as the operate lamp 43 thereat, is unilluminated. The attendant thereupon operates the call button 47 which through its lower set of contacts applies a ground to a circuit through the inner left hand tongue and back contact of relay BRM and the left hand coil of the relay SRM to potential causing the latter relay to operate. As relay SRM operates, it locks up by a circuit through its right hand coil and associated front contact and tongue to ground through a back contact of relay C3. The operation of relay SRM, while the call button 47 is depressed opens the sending leg of the line circuit, causing relay RM and the other corresponding relays at the other stations to release. The relays in turn cause release of all the receiving distributors, such as 27, on the way-wire and register an all-spacing blank character. Such a character operates all the pulse relays P1 to P5 and at selector 16 a circuit is established through front contacts and left hand tongues thereof and the coil of relays C0 and BRM when the brush 31 reach segments 39 and 39' of the distributor. The operation of relay BRM causes the operate lamp 43 and the busy lamp 48 to light and also short circuits the upper contacts of the call button 47, thus closing the line and terminating the blank character signal. At selector 18 the operation of only the relays BRU and BRA in response to the blank character completes circuits to cause operation of only the associated busy lamps at the stations A and U. When the operate lamp 43 of station M lights, it indicates to the attendant that the line has been seized and the message may then be transmitted to the central office.

The way-wire may be released and restored to normal by the transmission from many of the way-stations of the end-of-message signal consisting of two carriage return signals followed by a letters signal, in the same manner as when responding to such an end-of-message signal transmitted from the central office.

If the way-station operator at a station such as station M sends carriage return, blank, carriage return, letters, as a message termination, the first carriage return operates relays C1 and C2, as described, and the following blank character operating all five of the pulse relays P1 to P5 closes a circuit fom segment 39 through the left hand coil of relay C0 to potential. The operation of relay C0 releases relays C1 and C2 cancelling the first carriage return character at selector 16 and the second carriage return character re-operates relays C1 and C2. The following letters character, all marking, does not operate any of the pulse relays P1 to P5 but does complete a circuit for operating relay C0 through back contacts of relays P5, P1, P2, P3 and a front contact of relay C2. Such operation of the relays causes relays C1 and C2 to again release to restore the circuits to its normal operating condition with the calling way-station in control of the way-wire. Thus, a way-station transmitting a message to the central office may terminate the message by interposing a blank character between the carriage return characters of the usual end-of-message signal without releasing control of the way-wire. The way-station may then transmit another message without the necessity of operating the call button 47.

*Transmitting from station U*

The seizing of the way-wire by a teleprinter set at a station remote from its controlling selector such as station U is accomplished in substantially the same manner as that set forth above. However, since such a station is associated with its selector by extended legs additional circuits are involved.

With the way-wire idle, the operation of call button 63 at station U effectively opens the sending leg 57 since the rectifier 73 prevents the flow of positive current and relays CRU and SU release. The release of relay CRU completes a circuit for operating relay SRU which removes the short circuit from potential 55 around the tongue and marking contact of receiving relay RU. This connects the receiving leg 53 to the marking contact of relay RU and the selector magnet 54 of the teleprinter set will follow further operation of relay RU. The outer right hand tongue of relay SRU removes the short circuit around the tongue and marking contact of relay SU and since relay SU at this time is deenergized, an open line condition is transmitted. At all the other stations the receiving relays, such as RU and RA, release. As described hereinbefore this causes the transmission of a blank character to the way-way to operate the pulse relays P1 to P5 and the operation of relays such as BRU and BRA at all the way stations. The operation of relay BRU reoperates relay CRU as well as relay SU. This closes the line circuit and terminates the blank character and operates relay RU. The right hand coil of relay SU has one terminal thereof connected to negative potential and the operation of relay BRU extends this negative potential through front contacts of the relays BRU and SRU to the sending leg 57. At station U this negative potential extending through the coils of relays 58 and 59 is permitted to flow through rectifier 73 and thus operates relay 58 and releases relay 59. Such operation of the relays 58 and 59 completes a circuit for the operation of the AC relay 61 and the illumination of the operate and busy lamps. Relay 61 in operating locks up by a circuit through back contacts of relay 59 and its outer tongue removes the short circuit around the keyboard contacts 62. With the keyboard contacts 62 in the circuit of the sending leg 57 signals may be transmitted therefrom to the selector at station S. These signals operate relay SU to interrupt the way-wire in accordance therewith and thus the signals from the keyboard are transmitted to the central office. Relay RU responds to such signals and repeats them back over the receiving leg 53 to the selector magnet 54 to provide a copy of the message sent from station U. The teleprinter set 21 at station U may be disconnected from the way-wire in the same manner as described above in connection with station M by the transmission of the end-of-message signal.

In substantially the same manner, the teleprinter set at station A may seize and transmit to the way-wire over extension 12A and during such times the operation of relay BRU completes circuits to permit the busy lamp at station U to be illuminated in the same manner as the busy lamp at station A is illuminated during transmission from station U.

*Automatic transmission of end-of-message signal*

As disclosed in Fig. 2, the central office 11 has in addition to the transmitter 76 and receiver 77 a circuit for automatically transmitting an end-of-message signal to the way-wire 12 when one of the transmitting stations fail to transmit such a signal following a message. This circuit is shown as being at the central office but may be located at any of the other way-stations and is operative a predetermined length of time following the transmission of a message which is not terminated by and end-of-message signal. As shown in Fig. 2, the above circuit includes a distributor 78 with 4 segmented rings 79, 80 81 and 82 along with an electronic timer 83 and control relays 84 and 86.

Rings 81 and 82 of the distributor 78 are wired in series with the sending leg 13 of the way-wire 12 and are normally short circuited by the outer tongue and back contact of relay 84. The left hand tongue and back contact of relay 84 as well as a tongue and front contact of relay 86 and a tongue and front contact of the electronic timer relay 87 are wired in series with a control circuit 88 called a "seize initiate circuit" and prevents transmission to the way-wire until after an end-of-message signal has been sent thereover following a message.

When a way-station stops sending the armature of the central office receiving relay 89 remains against its marking contact and thus opens the circuit to relay KTS in the electronic timer 83. With relay KTS released the condenser 91 of the timer is permitted to discharge through resistance 92 and slowly reduce the negative potential on the control anode 93 of electronic tube 94 of the 0A4G type. If this condition prevails for at least a predetermined length of time which may be in the neighborhood of ten to twelve seconds, the negative charge on control anode 93 is reduced sufficiently to ionize tube 94 and cause operation of relay 87 in the plate circuit thereof.

The operation of relay 87 completes a circuit from ground through contacts 96 of relay 86 to segment 9 of distributor ring 79. When the constantly rotating brush 97 subsequently reaches segment 8 of ring 80, this ground is extended through the right hand coil of relay 84 to potential. Relay 84 operates and locks up and also removes the short circuit around rings 81 and 82 of the distributor. Thus, the distributor is cut into the sending leg 13 and the segments of ring 82 are at this time so arranged that two carriage return signals are set up thereon and transmitted to the line as brush 98 traverses the same. When brush 97 subsequently reaches segment 10 of ring 80 which is during the transmission of the second carriage return character, the ground of segment 9 is extended through a front contact of relay 84 and the coil of relay 86 to potential. Relay 86 is thereby operated and through its left hand tongue connects segments 1, 2, 3 and 5 of the right hand group of ring 82 to the sending leg and causes a letters character, all marking, to be transmitted during the next half revolution of the distributor 78. Thus, the end-of-message or clear-out signal of two carriage return characters followed by a letters character is automatically transmitted when one of the stations ceases transmitting for a predetermined length of time without sending the end-of-message signal.

When the brush 97 reaches segment 18 a circuit is completed from ground through front contacts of relays 87, the inner right hand tongue of relay 86, a front contact of relay 84, segment 19, brush 97, segment 18, through the left hand coil of relay CR to potential. This circuit is in opposition to the holding circuit in the right hand coil of relay 84 and causes the relay to release. As relay 84 releases it reapplies the short circuit through its outer right hand tongue and back contact around the ring 81 and 82 and thus stops transmission of signals to the way-wire 12. At this time the control circuit 88 is closed through contacts of relays 84, 86 and 87 and is so arranged as to permit any transmitter such as 76 to seize and transmit to the line. Relay 86 remains energized until the first spacing pulse of an incoming message from the way-wire releases relay 89 to reoperate relay KTS which causes release of relay 87.

The circuits as described heretofore would be employed on a way-wire wherein there would be few occasions of one way-station desiring to communicate with another on the same way-wire since most of the messages are sent to and received from the central office.

Figure 8:
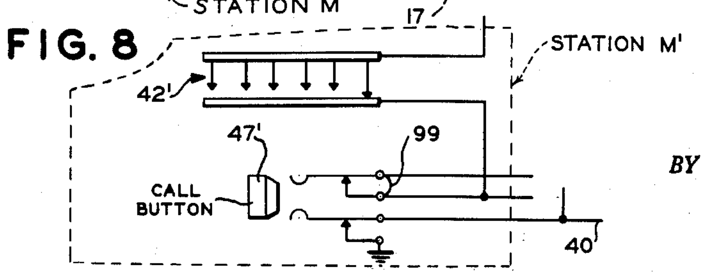
Fig. 8 is a modified circuit diagram of a part of the system.

In such cases the way-stations send all messages to the central office even though the message is destined for another way-station on the same way-wire and the central office repeats these messages back to the desired way-station. However, on some way-wire installations, there may be considerable interchange of messages between the stations. In such cases, the selectors such as the selector 16, Figs. 3 and 4, may be adapted to enable one station on the way-wire to directly call another way-station on the same wire. If the upper two contacts of the call button on the teleprinter set such as the call button 47', Fig. 8, are strapped together by a strap such as 99, the line will not be opened to transmit a blank character when the call button is operated. Thus, the operator after depressing a call button, such as 47', which associates station M' with the way-wire may send from the printer keyboard 42' to the call letter of one or more other stations to activate the teleprinter sets thereat and render the same responsive to record the following signals. Such call letters are followed by a space combination to busy the other uncalled way-stations and lock them out whereupon the operator may transmit the message. The following end-of-message signal releases the selected stations in the same manner as set forth above.

While the invention has been described in but a single embodiment thereof, it will be obvious that various modifications may be made without departing from the essential attributes thereof and it is desired therefore that only such limitations be placed thereon as are imposed by the appended claims.

What is claimed is:

1. A telegraph system comprising a multi-station normally closed line, a central station and a plurality of remote stations associated with said line, permutation code transmitting means and a manually operable key at each of said remote stations, said transmitting means at said remote stations normally being operatively disassociated from said line, means operative on the actuation of a key at any one of said remote stations with said line in an idle condition to open said normally closed line to initiate the transmission of an open line condition, means independent of said key for closing said line following a predetermined length open line condition and to operatively associate the transmitting means thereat with said line, and means operative during the transmission of said open line condition and while one of the transmitting means is operatively associated with said line to prevent the operative association of another transmitting means therewith by the operation of a key thereat.

2. A telegraph system comprising a multi-station normally closed line, a central station and a plurality of remote stations associated with said line, permutation code transmitting means and a manually operable key at each of said remote stations, said transmitting means at said remote stations normally being operatively disassociated from said line, means operative on the actuation of one of said keys at a remote station with said line in an idle condition to open said normally closed line to initiate the transmission of an open line condition, means independent of said key for closing said line following a predetermined length open line condition and to operatively associate the transmitting means thereat with said line, and means operative during the transmission of said open line condition and while one of the transmitting means is operatively associated with said line to disable the key controlled means at the other of said stations and prevent the operative association of another transmitting means with said line.

3. A telegraph system comprising a multi-station normally closed line, a central station and a plurality of remote stations associated with said line, permutation code transmitting means and a manually operable key at each of said remote stations, said transmitting means at said remote stations normally being operatively disassociated from said line, means operative on the actuation of one of said keys at a remote station with said line in an idle condition to open said normally closed line to initiate the transmission of an open line condition, means independent of said key for closing said line following a predetermined length open line condition and to operatively associate the transmitting means thereat with said line and means controlled by a predetermined sequence of characters transmitted by an operatively associated transmitting means to disassociate the same from said line.

4. In a telegraph system, a normally closed communication circuit, a plurality of stations associated with said circuit, said stations each having permutation code message transmitting means normally operatively disassociated from said circuit, a calling key at each of said stations, first and second relays at each of said stations, means responsive to the actuation of the calling key at a station to operate the first and second relays thereat and initiate the transmission to said line of a predetermined character code, means independent of said key to terminate said code, means responsive to said predetermined character code to operate the second relays at the other stations, means responsive to the operation of the first and second relays at said calling station to associate the message transmitting means thereat with said circuit and means responsive to the operation of only the second relays at the other stations to prevent the association of the transmitting means thereat with said circuit.

5. In a telegraph system, a normally closed communication circuit, a plurality of stations associated with said circuit, said stations each having permutation code message transmitting means normally operatively disassociated from said circuit, a calling key at each of said stations, first and second relays at each of said stations, means responsive to the actuation of the calling key at a station to operate the first and second relays thereat and initiate the transmission to said line of a predetermined character code, means independent of said key to terminate said code, means responsive to said predetermined character code to operate the second relays at the other station, means responsive to the operation of the first and second relays at said calling station to associate the message transmitting means thereat with said circuit and means responsive to the operation of only the second relays at the other stations to disable the calling keys thereat.

References Cited in the file of this patent

UNITED STATES PATENTS

| | | |
|---|---|---|
| 2,148,435 | Carr | Feb. 28, 1939 |
| 2,332,645 | Keithley et al. | Oct. 26, 1943 |
| 2,455,724 | Bacon | Dec. 7, 1948 |
| 2,522,453 | Keyes | Sept. 12, 1950 |
| 2,675,535 | Davidsmeyer et al. | Apr. 13, 1954 |